United States Patent [19]

Taira

[11] 4,412,593

[45] Nov. 1, 1983

[54] STRUCTURE FOR SUPPORTING AUTOMOBILE HORN

[75] Inventor: Toshiju Taira, Toyota, Japan

[73] Assignee: Nippondenso Co., Ltd., Kariya, Japan

[21] Appl. No.: 227,245

[22] Filed: Jan. 22, 1981

[30] Foreign Application Priority Data

Jan. 24, 1980 [JP] Japan .................................... 55-6606

[51] Int. Cl.[3] ................................................ B60Q 5/00

[52] U.S. Cl. ................................ 180/68 P; D10/120; 179/146 E; 296/31 P; 340/391

[58] Field of Search ............................ 180/68 P, 68 R; 296/1 C, 31 P; 293/115; 116/59, 58; D10/120; D12/163, 170; 52/27, 473, 667; 340/391, 404; 179/146 E

[56] References Cited

U.S. PATENT DOCUMENTS

| | | | |
|---|---|---|---|
| D. 79,502 | 10/1929 | Cheron | D10/120 |
| 2,905,286 | 9/1959 | Adams et al. | 293/115 |
| 3,041,601 | 6/1962 | Wetzel | 340/391 |

FOREIGN PATENT DOCUMENTS

| | | | |
|---|---|---|---|
| 347314 | 7/1919 | Fed. Rep. of Germany | 180/68 R |
| 1576730 | 9/1970 | Fed. Rep. of Germany | 180/68 P |
| 2355972 | 5/1974 | Fed. Rep. of Germany | 180/68 P |
| 163269 | 5/1958 | Sweden | 340/391 |

OTHER PUBLICATIONS

"Plastics and the Motor Industry" *Automobile Engineer* Jul. 1971.

*Primary Examiner*—David M. Mitchell

*Attorney, Agent, or Firm*—Cushman, Darby & Cushman

[57] ABSTRACT

A structure for supporting an automobile horn. The structure includes a radiator grille made of a synthetic resin and having a recess at its one side for receiving the body of the horn, such that the sound radiating front portion of the horn is directed toward the front side of the automobile, and a frame member provided in the recess into which the body of the horn is fitted. The structure can have a locking member adapted for engaging the rear end portion of the frame so as to cooperate with the frame in clamping therebetween the peripheral portion of the horn body.

3 Claims, 5 Drawing Figures

STRUCTURE FOR SUPPORTING AUTOMOBILE HORN

BACKGROUND OF THE INVENTION

The present invention relates to a structure for supporting an automobile horn and, more particularly, an improved structure for supporting a horn on a motor vehicle having a radiator grille made of a synthetic resin.

The automobile horns are usually attached to a stationary part in the engine room of the automobiles. There are, however, many parts such as radiator for cooling the cooling water of the engine, condenser of the air conditioner and so forth which have to be mounted at the frontmost part of the engine room near the front grille, so that the designers are obliged to mount the horn at a portion of the engine room spaced from the front end of the latter. In consequence, the warning phone radiated from the horn is interrupted by the parts installed at the front part of the engine room, inevitably resulting in an attenuation or reduction of the level of sound pressure to shorten the reach of the warning phone. In fact, the reduction of the sound pressure level due to the presence of parts at the front part of the engine room well reaches 10 dB or more, so that is necessary to mount an automobile horn having a high output in order to compensate for the reduction of the sound pressure level.

The safety Standard of Japanese Road Transportation Vehicles states to effect that the sound level of the warning phone must fall within the region of between 90 dB and 115 dB as measured at a point 2 m ahead of the automobile. Thus, the automobile horn is required to have an output large enough to produce a sound pressure of at least 90 dB at the point 2 m ahead of the automobile. This means that, taking into account the 10 dB drop of sound pressure as stated before, the horn mounted in the engine room of the automobile must have an output large enough to provide a sound level of 100 dB at the point 2 m ahead of the automobile, assuming that no obstructing part is attached to the front end of the engine room. Considering the margin of the sound level, it is preferred that the horn has an output sufficiently large to provide a sound level of 105 dB or so at that point.

Thus, the automobile horn mounted in the engine room is required to have an unnecessarily high output, which in turn demands a horn of large volume and weight and consuming large electric power. This poses a problem, particularly, in small-sized automobiles having only limited space of engine room, because it is extremely difficult to preserve a suitable space for accommodating the horn.

To overcome these problems, it has been proposed to attach the horn to the rear side of the front bumper of the automobile. This solution, however, is found unacceptable because of unfavourable result caused by an invasion by rain water.

The attaching of the automobile horn to the stationary part in the automobile is made through the medium of a suitable stay member. This arrangement poses another problem of electrolytic corrosion of the terminal portion, because the body of the automobile horn is made of a metallic material. Since the stationary part connected to the chassis of the automobile usually constitutes the earthing side of the electric system, the automobile horn body is also at the grounding potential. Two terminals are exposed at the terminal portion of the horn, one of which is connected to the power source while the other is grounded through a horn switch. This means that a certain voltage or potential is always applied to the terminals of the terminal portion of the automobile horn, i.e. a certain potential difference between the terminal portion and the body of the automobile horn. Therefore, an electrolytic corrosion takes place when water comes between the body of the automobile horn and the terminal portion of the same, to cause a corrosion at the terminal portion. The problem of corrosion of terminal portion of the automobile horn and, hence, the dropping of the terminals, is serious particularly in the district having much snow fall, because in such district anti-freezing agent is sprayed on the road surface. In order to obviate this problem, various measures are taken such as the use of a water-proof connector, a relay for usually maintaining the terminal portion at the gounding potential and so forth. These measures, however, uneconomically raise the cost of the automobile.

SUMMARY OF THE INVENTION

It is, therefore, a major object of the invention to provide a novel structure for supporting an automobile horn, capable of overcoming the above-described problems of the prior art.

More specifically, it is an object of the invention to provide a supporting structure for automobile horn, in which the horn is directly attached to a radiator grille made of a synthetic resin. Since the horn is attached to the radiator grille which is usually mounted at the frontmost part of the engine room, there is no sound obstructing part ahead of the horn, so that the undesirable drop of the sound level is avoided to permit the use of an automobile horn having reduced output. In addition, since the radiator grille to which the horn is directly attached is made of a synthetic resin, the body of the automobile horn is electrically insulated from the grounding side of the electric system and, accordingly, is not held at the grounding potential, so that the aforementioned problem concerning the electrolytic corrosion is overcome.

To this end, according to the invention, there is provided a supporting structure for automobile horn, wherein the horn fits in a recess formed in the grid portion of a radiator grille made of a synthetic resin and is directly attached to the latter, such that the sound radiating front side portion of the horn is received by the recess while the rear side portion of the same faces toward the engine room of the automobile.

The above and other objects, as well as advantageous features of the invention will become clear from the following description of the preferred embodiments taken in conjunction with the accompanying drawings.

DESCRIPTION OF THE PREFERRED EMBODIMENTS

Figure 1:
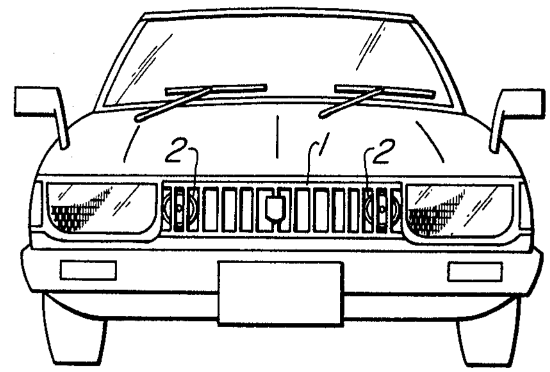
FIG. 1 is a front elevational view of an automobile having a horn supporting structure in accordance with an embodiment of the invention.
Figure 2:
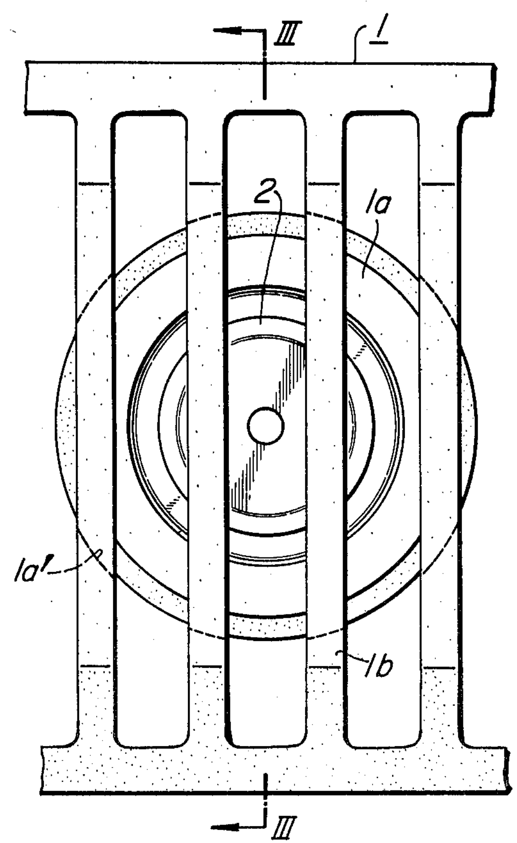
FIG. 2 is an enlarged view of a part of the embodiment shown in FIG. 1.
Figure 3:
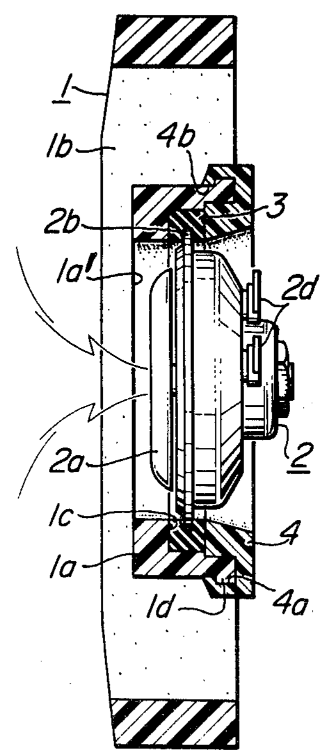
FIG. 3 is a sectional view taken along the line III—III of FIG. 2.

Referring to FIG. 1 showing a front elevation of an automobile, automobile horns 2 are attached to the rear side, i.e. the side facing the engine room, of a radiator grille 1 made of a synthetic resin. FIG. 2 is an enlarged view of a part of the radiator grille shown in FIG. 1, while FIG. 3 is a sectional view of the same. From these Figures, it will be seen that a recess 1*a*' is formed in the grid portion 1*b* of the radiator grille 1, and an annular frame 1*a* integral with the grid portion 1*b* is provided in the recess 1*a*'. Each automobile horn 2 is received by corresponding recess 1*a*, in a manner explained hereinbelow.

The frame 1*a* is provided with an annular flange 1*c* which constitutes a receiving portion for receiving the peripheral flange portion 2*b* of the automobile horn 2. An annular cushioning member 3 is fitted around the peripheral flange portion 2*b* of the automobile horn 2, so that effectively the member 3 has a radially-inwardly-facing annular groove receiving the flange 2*b*. The automobile horn 2 is placed in the frame 1*a* with the cushioning member 3 interposed therebetween, such that the sound radiating front portion 2*a* thereof faces toward the front side, i.e. in the direction of movement of the automobile. The cushioning member 3 is effective in absorbing the vibration of the automobile horn 2. The frame 1*a* has a thin-walled rear end portion around which formed is an annular projection 1*d* to which fitted is an annular groove 4*a* of an annular locking member 4 adapted to lock the automobile horn 2. Thanks to the provision of an annular engaging portion 4*b* in the annular groove 4*a*, the annular locking member 4 can make a snap fit with the annular projection 1*d* of the frame 1*a*. According to this arrangement, the automobile horn 2 can be attached to the automobile simply by placing the same in the frame 1*a* and then fitting the annular locking member 4 into the frame 1*a*.

It will be seen that, since the automobile horn 2 is fitted to the recess 1*a*' formed in the rear side of the radiator grille 1 facing the engine room, the automobile horn 2 is located at such a front part of the automobile that there is no obstruction which would cause the drop of the sound pressure level. In the described embodiment, the sole member disposed ahead of the sound radiating front side portion 2*a* of the automobile horn 2 is the grid 1*b* of the front grille 1. It has been confirmed throughout experiments that the reduction of sound pressure level due to the presence of the grid portion 1*b* is negligibly small.

In addition, since the automobile horn 2 is attached directly to the front grille 1 made of a synthetic resin, the body of the automobile horn 2 is never maintained at the grounding potential and, accordingly, the failure at the terminal portions 2*d* due to electrolytic corrosion is fairly avoided.

Figure 4:
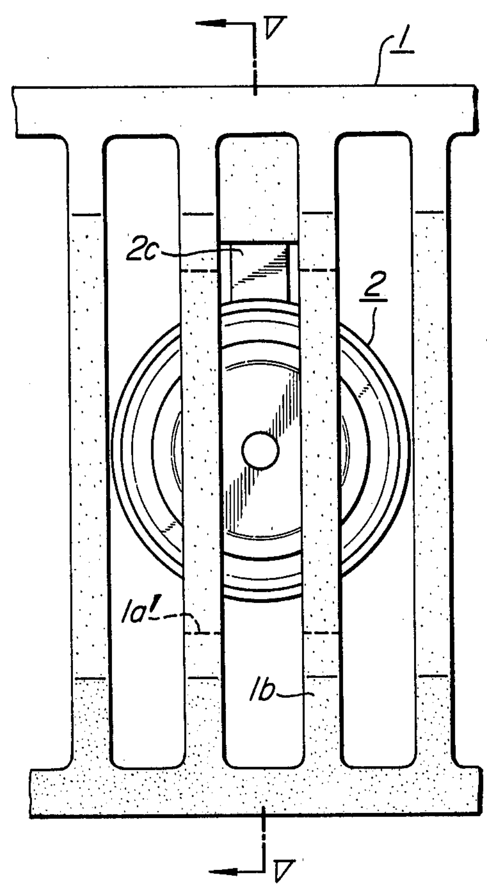
FIG. 4 is an enlarged view of a part of a second embodiment of the invention.
Figure 5:
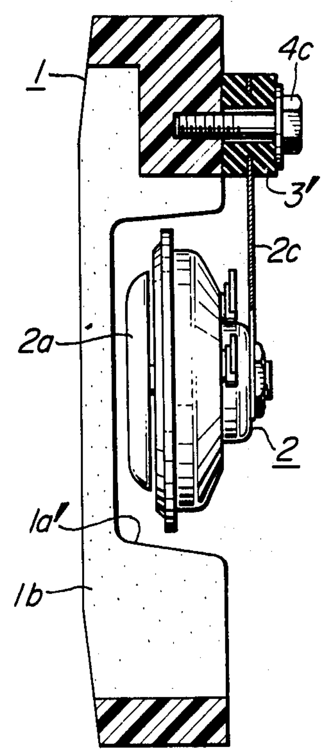
FIG. 5 is a sectional view taken along the line V—V of FIG. 4.

FIGS. 4 and 5 show a second embodiment of the invention. More specifically, FIG. 4 illustrates an essential part of the structure shown in FIG. 1 at a larger scale, while FIG. 5 shows the same portion in section. In this embodiment, the automobile horn 2 received by the recess 1*a*' formed in the grid 1*b* of the radiator grille 1 is secured to the latter through the medium of a stay member 2*c*. The stay member 2*c* makes at its one end a screwing engagement with the body of the automobile horn 2, while the other end of the same is secured to the front grille 1 through the medium of a cushioning element 3' by means of screws 4*c*. The cushioning member 3' is not essential and may be dispensed with, provided that the stay member 2*c* is constructed to exhibit a sufficient vibration absorbing nature.

Although the invention has been described through its preferred forms, it is to be noted here that the described embodiments are not exclusive, and various changes and modifications may be imparted thereto without departing from the scope of the invention which is limited solely by the appended claims.

For instance, although the recess for receiving the automobile horn is formed in the rear side of the radiator grille, this is not essential and the recess may be formed at the front side, i.e. at the side opposite to the engine room, of the radiator grille.

I claim:

1. A structure for supporting an automotive horn having a circular peripheral flange to an automotive vehicle provided with a synthetic resin radiator grille having a rear side portion, comprising:

an annular synthetic resin frame integrally incorporated with said radiator grille at said rear side portion and defining a rearwardly facing annular recess for receiving the peripheral flange of the horn;

a cushioning member disposed in said recess and having a radially-inwardly-facing annular groove for receiving the peripheral flange of the horn; and an annular locking member attachable to said frame to retain said member and the horn in said recess.

2. A structure as set forth in claim 1, wherein said annular frame is recessed into the rear side portion of the grille.

3. A structure as set forth in claim 1 wherein said frame has an annular flange with which said locking member is engaged with a snap action.

* * * * *